United States Patent
Nanbu

(10) Patent No.: US 6,616,178 B1
(45) Date of Patent: Sep. 9, 2003

(54) HEAD PROTECTIVE BAG

(75) Inventor: Yuichi Nanbu, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/690,436

(22) Filed: Oct. 18, 2000

(30) Foreign Application Priority Data

Oct. 18, 1999 (JP) .......................................... 11-295748

(51) Int. Cl.$^7$ .......................... B60R 21/16; B60R 21/22
(52) U.S. Cl. .................................. 280/730.2; 280/743.1
(58) Field of Search .......................... 280/730.2, 729, 280/728.2, 743.1

(56) References Cited

U.S. PATENT DOCUMENTS

| | | | | |
|---|---|---|---|---|
| 5,322,322 A | * | 6/1994 | Bark et al. ................ | 280/730.2 |
| 5,566,977 A | | 10/1996 | Wipasuramonton ...... | 280/743.1 |
| 5,588,672 A | | 12/1996 | Karlow et al. ........... | 280/730.2 |
| 5,722,685 A | * | 3/1998 | Eyrainer .................. | 280/730.2 |
| 5,788,270 A | * | 8/1998 | HÅland et al. ............. | 280/729 |
| 5,884,937 A | * | 3/1999 | Yamada .................... | 280/730.2 |
| 5,899,491 A | * | 5/1999 | Tschaeschke ............ | 280/730.2 |
| 5,957,487 A | * | 9/1999 | Stutz ........................ | 280/730.2 |
| 6,010,149 A | * | 1/2000 | Riedel et al. ............. | 280/730.2 |
| 6,056,316 A | * | 5/2000 | Yamaji et al. ............ | 280/730.2 |
| 6,073,961 A | * | 6/2000 | Bailey et al. ............. | 280/730.2 |
| 6,129,377 A | * | 10/2000 | Okumura et al. ........ | 280/730.2 |
| 6,135,493 A | * | 10/2000 | Jost et al. ................. | 280/730.2 |
| 6,155,596 A | * | 12/2000 | Nakajima et al. ........ | 280/730.2 |
| 6,168,191 B1 | * | 1/2001 | Webber et al. ........... | 280/730.2 |
| 6,170,860 B1 | * | 1/2001 | Denz et al. ............... | 280/730.2 |
| 6,176,513 B1 | * | 1/2001 | Neidert ...................... | 280/729 |
| 6,176,514 B1 | * | 1/2001 | Einsiedel ................. | 280/730.2 |
| 6,199,898 B1 | * | 3/2001 | Masuda et al. .......... | 280/730.2 |
| 6,227,561 B1 | * | 5/2001 | Jost et al. ................. | 280/730.2 |
| 6,237,937 B1 | * | 5/2001 | Kokeguchi et al. ...... | 280/730.2 |
| 6,260,878 B1 | * | 7/2001 | Tanase .................... | 280/730.2 |
| 6,273,456 B1 | * | 8/2001 | Heigl ....................... | 280/730.2 |
| 6,318,753 B1 | * | 11/2001 | Valkenburg .............. | 280/730.2 |
| 6,457,740 B1 | * | 10/2002 | Vaidyaraman et al. ... | 280/730.2 |

FOREIGN PATENT DOCUMENTS

| | | |
|---|---|---|
| DE | 297 05 489 UA | 9/1997 |
| DE | 198 16 061 A1 | 1/1998 |
| DE | 298 04 004 U1 | 8/1998 |
| JP | 10297410 A * | 11/1998 |
| JP | 11208410 A * | 8/1999 |
| WO | WO 96/26087 | 8/1996 |
| WO | WO 98/42548 | 10/1998 |

* cited by examiner

*Primary Examiner*—Paul N. Dickson
*Assistant Examiner*—Ruth Ilan
(74) *Attorney, Agent, or Firm*—Foley & Lardner

(57) ABSTRACT

A head protective bag for vehicle passengers. The bag includes a lower section of which is tightly expanded when the bag is inflated. The protective bag includes an cabin side sheet and a window sheet. The sheets are overlapped and then coupled together along a line to form a main airway and small cells between the sheets. A front portion of the bag is located along an A-pillar of the vehicle in a folded state. An intermediate portion and a rear portion of the bag are located along a roof side rail and a C-pillar in a folded state. If the bag is maximally inflated without being installed in the vehicle, the dimension L from the through hole of a lowermost projection of the front section of the bag to the through hole of a lowermost projection of the rear section of the bag is smaller than the linear distance S from a position at which the lowermost front projection is secured to the A-pillar to a position at which the lowermost rear projection is secured to the C-pillar.

11 Claims, 7 Drawing Sheets

HEAD PROTECTIVE BAG

This application is related to Japanese Patent Application No. H11-295748, filed Oct. 18, 1999, the disclosure of which is incorporated by reference herein in its entirety.

BACKGROUND OF THE INVENTION

1. Field of Invention

The present invention relates to head protective bags for vehicle passengers, and, more particularly, to bags inflated along a side window or the like when a side of the vehicle is crashed or the vehicle is rolled over. More specifically, the present invention relates to head protective bags for vehicle passengers that are inflated by gas. Further, the present invention relates to head protective devices for vehicle passengers having the head protective bags and vehicles having the protective devices.

2. Description of the Related Art

This type of head protective bag for vehicle passengers is described in WO 96/26087 and is illustrated specifically in FIGS. 1 and 9 of that publication. This known bag includes a duct portion (main airway) extending along an upper edge of the bag from an end (a front end) of the bag near the vehicle's front end to an end (a rear end) of the bag near the vehicle's rear end and a number of cell portions (small cells) connected to the duct portion are extending downward. The head protective bag described in WO 96/26087 will now be described with reference to FIG. 6 of this application.

This head protective air bag device 100 has main components including an elongated duct 106, an air bag body 112, an inflator 116, and a belt-like strap 118. The duct 106 extends along a front pillar portion 102 and a roof side rail portion 104. The air bag body 112 is accommodated in the duct 106 in a folded state and is secured to a vehicle body at a front securing point 108 and a rear securing point 110. The inflator 116 is connected to a rear end of the duct 106 through a hose 114 and generates gas when a predetermined load acts on a side of the vehicle body. One end of the strap 118 is secured to the vehicle body, and the other end of the strap 118 is secured to a rear end of the air bag body 112. The air bag body 112 is formed by connecting a plurality of cells 120. Each cell 120 is substantially cylindrical and is located such that a longitudinal direction of the cell 120 corresponds to a substantial upward or downward direction of the vehicle.

In this structure, the inflator 116 generates gas when a predetermined load acts on a side of the vehicle. The generated gas is sent to each cell 120 of the folded, air bag body 112 through the hose 114 and the duct 106. Accordingly, the cell 120 is inflated in a substantially cylindrical shape such that its longitudinal direction corresponds to the vehicle s upward or downward direction. The air bag body 112 is thus inflated along a window 122 in a curtain-like shape. Further, since the rear end of the air bag body 112 is connected to the vehicle body through the strap 118, the rear end of the air bag body 112 is reliably located in an upper section of a center pillar portion 124.

SUMMARY OF THE INVENTION

It is an objective of the present invention to provide a head protective bag for vehicle passengers, a lower section of which is tightly expanded when the bag is inflated, and a protective device and a vehicle having this protective bag.

A head protective bag for vehicle passengers of the present invention is located near a corner defined by a ceiling and a side wall of a passenger compartment and is inflated downward along the side wall by means of gas introduced from a gas inlet. The bag includes a front coupling portion secured to a first pillar near a front side of a vehicle and a rear coupling portion secured to a second pillar located rearward from the first pillar. The bag is characterized in that a dimension L between a lowermost front coupling portion and a lowermost rear coupling portion when the bag is maximally inflated (without being installed in the vehicle) is smaller than a distance S from a position at which the front coupling portion is secured to the first pillar to a position at which the rear coupling portion is secured to the second pillar.

When the head protective bag for vehicle passengers is maximally inflated without being installed in the vehicle, the dimension L between the front coupling portion and the rear coupling portion is smaller than the distance S. Accordingly, when the bag is inflated as installed in the vehicle, an increased tensile force is produced between the front coupling portion and the rear coupling portion of the bag. The portion of the bag between these coupling portions is thus tightly expanded. As a result, the tightly inflated bag receives a passenger who hits the bag.

To reduce the dimension L with respect to the distance S, it is preferred that a plurality of small cells are arranged in a forward or rearward direction in the bag and that a width of a lower section of the bag in the forward or rearward direction is larger than a width of an upper section of the bag in the forward or rearward direction. Further, to reduce the dimension L with respect to the distance S, the bag may include a cabin side sheet and a window side sheet. A cell in which the gas is introduced is formed between the sheets. A coupling portion is provided in the cell for coupling the sheets together. The number of the coupling portions in an upper section of the cell is larger than the number of the coupling portions in a lower section of the cell.

In the present invention, a single inflatable cell may be formed between the sheets.

BRIEF DESCRIPTION OF THE DRAWINGS

FIG. 1(*b*) is a sectional view along the lines B—B in FIG. 1(*a*).

FIG. 1(*c*) is a sectional view along the lines C—C in FIG. 1(*a*); FIG. 1(*d*) is a sectional view along the lines D—D in FIG. 1(*a*).

FIG. 1(*e*) is a sectional view along the lines E—E in FIG. 1(*a*).

DETAILED DESCRIPTION OF THE PREFERRED EMBODIMENTS

A head protective device for vehicle passengers of the present invention includes this head protective bag and an inflator connected to the gas inlet of the protective bag. A vehicle of the present invention includes the head protective device.

Figure 1A:
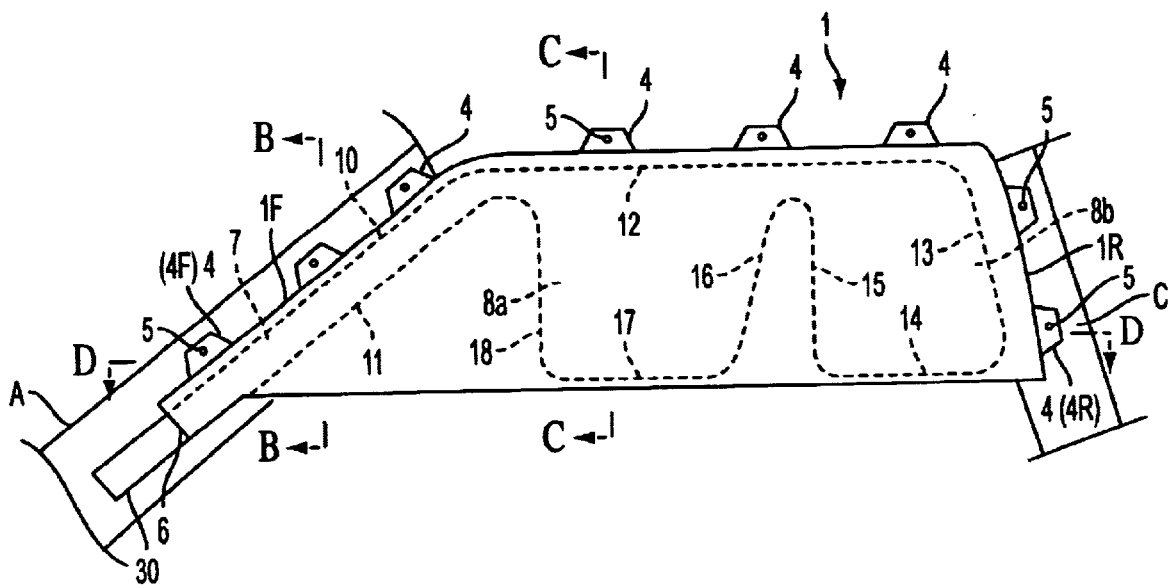
FIG. 1(*a*) is a side view showing the structure of a head protective bag for vehicle passengers of a first embodiment according to the present invention.
Figure 1B:
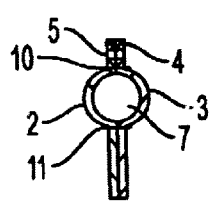
Figure 1C:
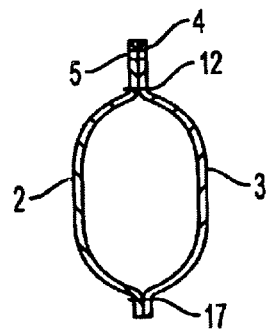
Figure 1D:
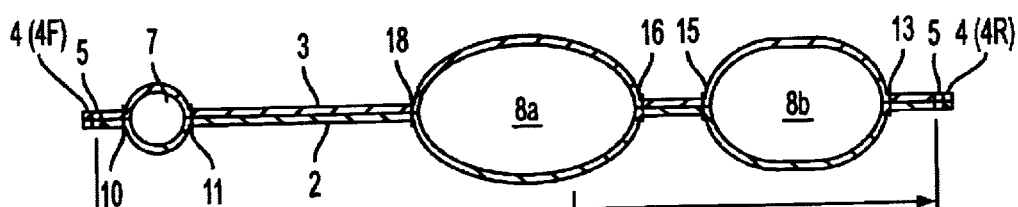
Figure 1E:
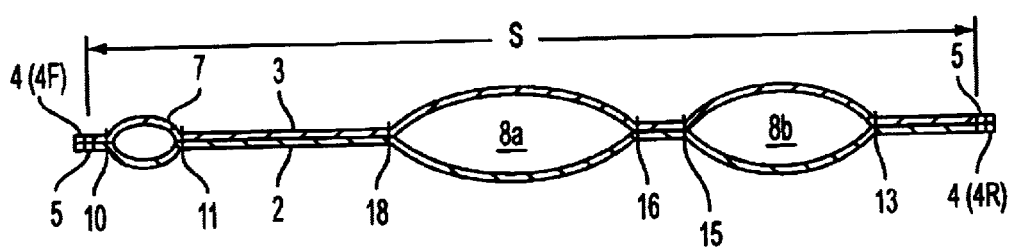

An embodiment of the present invention will now be described with reference to the attached drawings. FIG. 1 shows a head protective bag 1 for vehicle passengers of a first embodiment according to the present invention. FIG. 1(a) is a front view showing the bag 1. FIGS. 1(b) to 1(d) are cross-sectional views taken along lines B—B to D—D of FIG. 1(a), respectively. FIG. 1(e) is a cross-sectional view showing the portion shown in FIG. (d) when the bag 1 is installed in a vehicle.

The protective bag 1 of the first embodiment has a cabinside sheet 2 and a window side sheet 3. The cabin side sheet 2 and the window side sheet 3 are overlapped with each other and are coupled together along a line. In this manner, a main airway 7 and small cells 8a, 8b are provided between the sheets 2, 3. Each reference numeral 4 indicates a projection by which the bag 1 is secured to the vehicle's roof side member 32 and pillars A, C. Each reference numeral 5 indicates a through hole formed in each projection 4 for receiving a fastening tool such as a bolt and a rivet.

The main airway 7 extends along a front section 1F located along the pillar A, and an upper section of the main airway 7 is connected to an upper section of the small cell 8a. A gas inlet 6 is provided at a lower end of the main airway 7. An inflator 30 is connected to the gas inlet 6.

The sheets 2, 3 are coupled together at linear coupling portions 10, 11 that define the main airway 7 and linear coupling portions 12 to 18 that define the small cells 8a, 8b. The sheets 2, 3 may be coupled together through sewing or adhering or welding.

The linear coupling portions 10, 11 extend from the lower section of the front section 1F along the front section 1F to form the main airway 7, thus extending parallel to each other. The linear coupling portion 12 extends continuously from the linear coupling portion 10. The linear coupling portions 13, 14, 15, 16, 17, 18 are located in this order between the linear coupling portion 12 and the linear coupling portion 11. The linear coupling portion 13 extends along a rear section 1R of the bag 1.

The small cell 8a is defined by the linear coupling portions 12, 16, 17, 18, and the small cell 8b is defined by the linear coupling portions 12, 13, 14, 15. The upper section of the small cell 8a is connected to an upper section of the small cell 8b.

A front portion of the bag 1 extends along the A pillar of the vehicle in a folded state. An intermediate portion and a rear portion of the bag 1 extend along the roof side rail and the C-pillar in a folded state.

The bag 1 in a folded state is encompassed by a cover (not shown). The cover is ruptured when the bag 1 is inflated.

If a side of the vehicle is crashed or the vehicle is rolled over, the inflator 30 is activated to supply gas to the main airway 7 through the gas inlet 6. The gas is then introduced to the small cells 8a, 8b through the main airway 7 to inflate the cells 8a, 8b.

If the bag 1 is maximally inflated without being installed in the vehicle, the dimension from the through hole 5 of a lowermost projection 4 (4F) of the front section 1F to the through hole 5 of a lowermost projection 4 (4R) of the rear section 1R is defined as L. The linear distance from a position at which the projection 4F is secured to the pillar A to a position at which the projection 4R is secured to the C-pillar is defined as S. The dimension L is smaller than the distance S. Thus, if the bag 1 is inflated as installed in the vehicle, tensile force is produced by the inflating bag 1 between the projections 4F, 4R of the bag 1. Accordingly, the portion of the bag 1 between the projections 4F, 4R is tightly expanded. As a result, even if a passenger hits the bag 1, the bag 1 reliably receives the passenger, thus preventing the passenger from moving toward the exterior of the vehicle beyond a window.

To reduce the dimension L with respect to the distance S, the sheets 2, 3 of the bag 1 need be sized appropriately, and the linear coupling portions need be located appropriately for defining inflatable small cells.

Bags 20, 35, 40, 50 of other embodiments according to the present invention will hereafter be described with reference to FIGS. 2 to 5. Each bag 20, 35, 40, 50 includes a strap 19 instead of a lowermost projection of a rear section of the bag 20, 35, 40, 50. The strap 19 is secured to the C-pillar by a bolt or a rivet inserted through a hole 19a formed in the strap 19.

Figure 2:
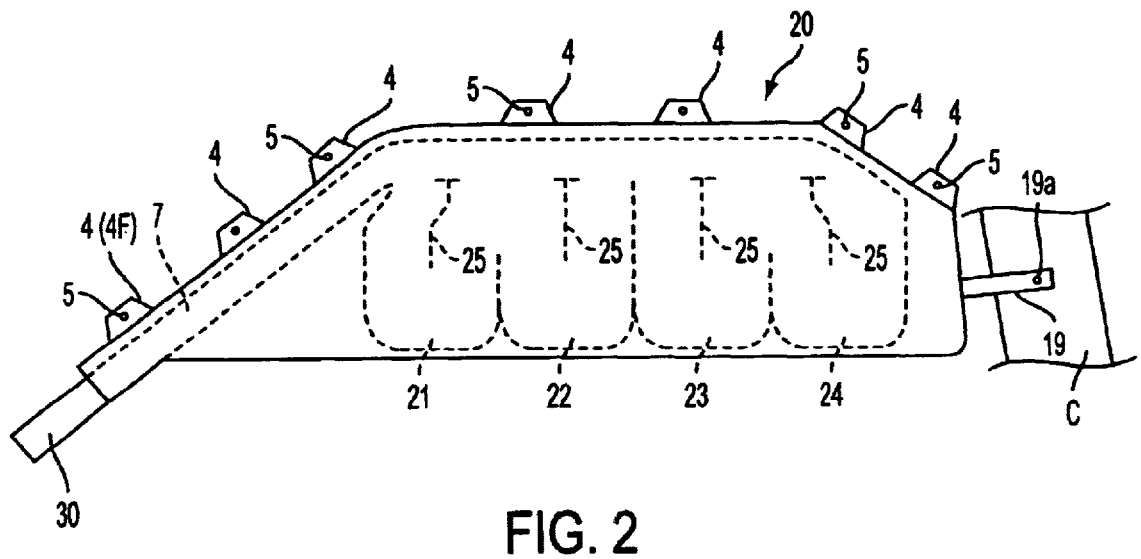
FIG. 2 is a side view showing the structure of a head protective bag for vehicle passengers of a second embodiment according to the present invention.

The bag 20 of FIG. 2 includes a plurality of small cells, for example, four small cells 21, 22, 23, 24 that are arranged in a forward or rearward direction. An upper section of each small cell 23 to 24 is divided into sections having a relatively small width by a relatively short linear coupling portion 25 extending in a upward or downward direction. These sections, which have a relatively small width in the forward or rearward direction, do not greatly shorten the dimension of the bag in the forward or rearward direction when the bag is inflated, unlike a lower section of each small cell 21 to 24 having a relatively large width in the forward or rearward direction. In other words, the linear coupling portions 25 do not extend between the through hole 5 of the projection 4F and the hole 19a of the strap 19. That is, only the small cells 21, 22, 23, 24 having a relatively large width in the forward or rearward direction are located between the through hole 5 of the projection 4F and the hole 19a of the strap 19. Accordingly, when the bag 20 is inflated, the distance between the through hole 5 of the projection 4F and the hole 19a of the strap 19 is sufficiently shortened. As a result, when the bag 20 is installed in a vehicle, the portion of the bag 20 between the projection 4F and the strap 19 is tightly expanded when the bag 20 is inflated.

Figure 3:
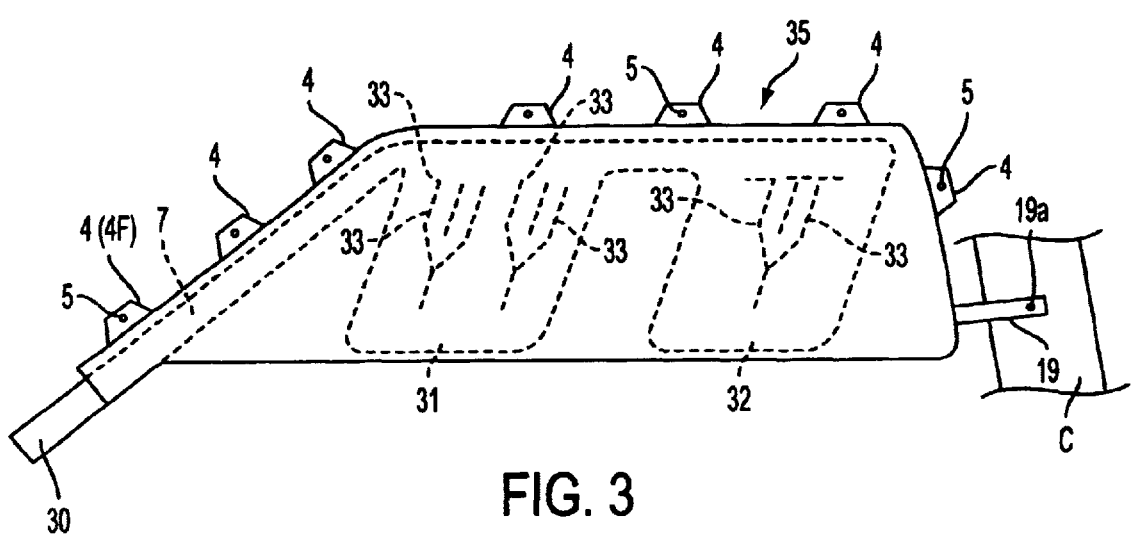
FIG. 3 is a side view showing the structure of a head protective bag for vehicle passengers of a third embodiment according to the present invention.

In the bag 35 of FIG. 3, a plurality of linear coupling portions 33 extending in the upward or downward direction divide upper sections of the associated small cells 31, 32 to a plurality of sections having a reduced width in the forward or rearward direction. The width of a lower section of each small cell 31, 32 in the forward or rearward direction is thus larger than that of each divided section in the upper section of the cell 31, 32. If the bag 35 is installed in a vehicle, the lower section of the bag 35 is tightly expanded when the bag 35 is inflated.

Figure 4:
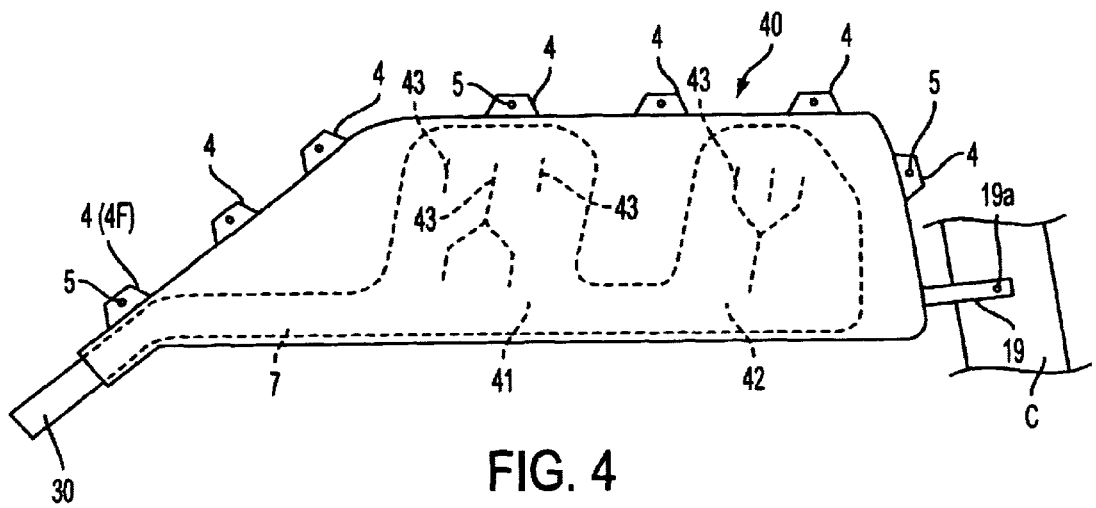
FIG. 4 is a side view showing the structure of a head protective bag for which passengers of a fourth embodiment according to the present invention.
Figure 5:
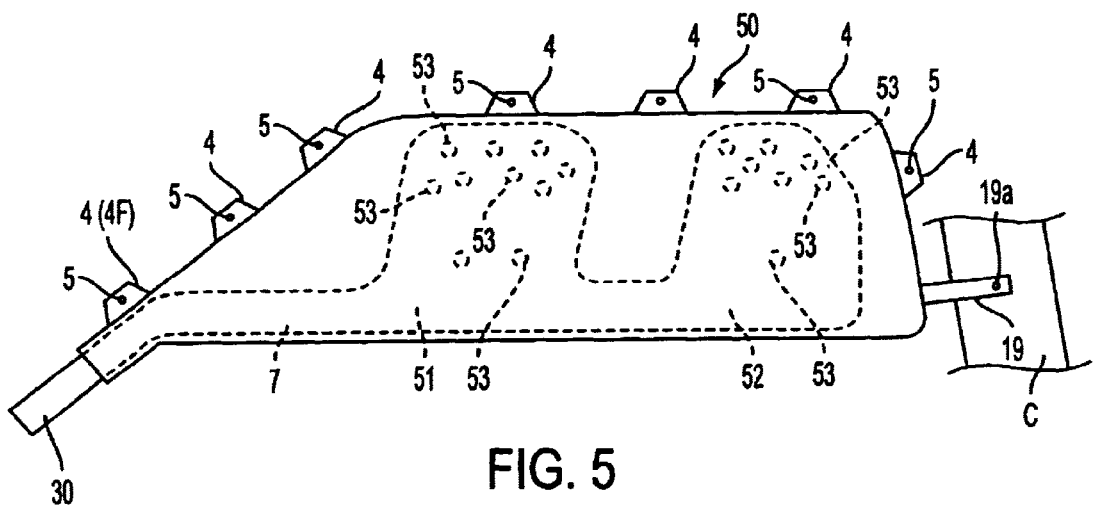
FIG. 5 is a view showing the structure of a head protective bag for vehicle passengers of a fifth embodiment according to the present invention.
Figure 6:
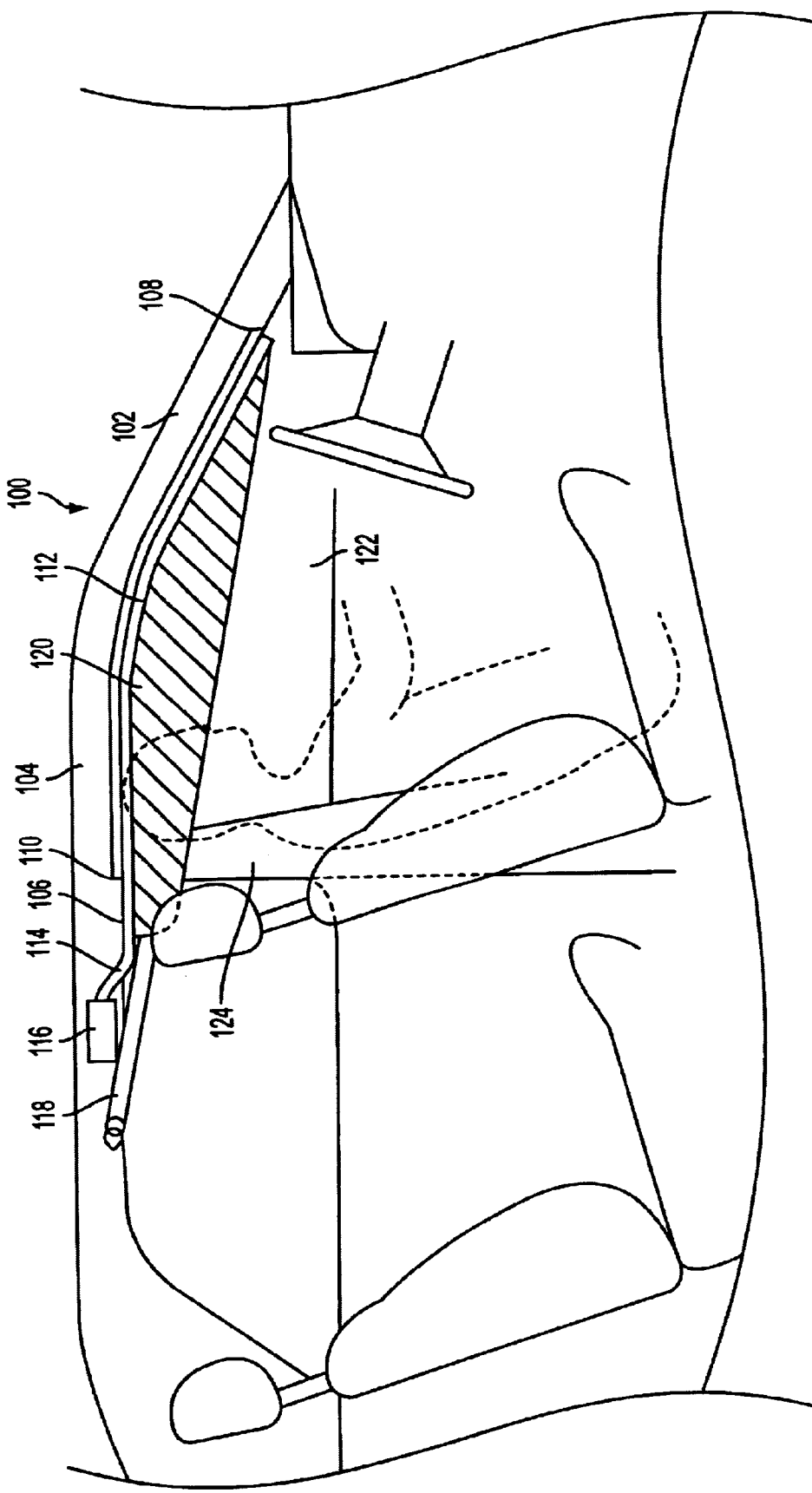
FIG. 6 is a side view showing the structure of a prior art example.
Figure 7A:
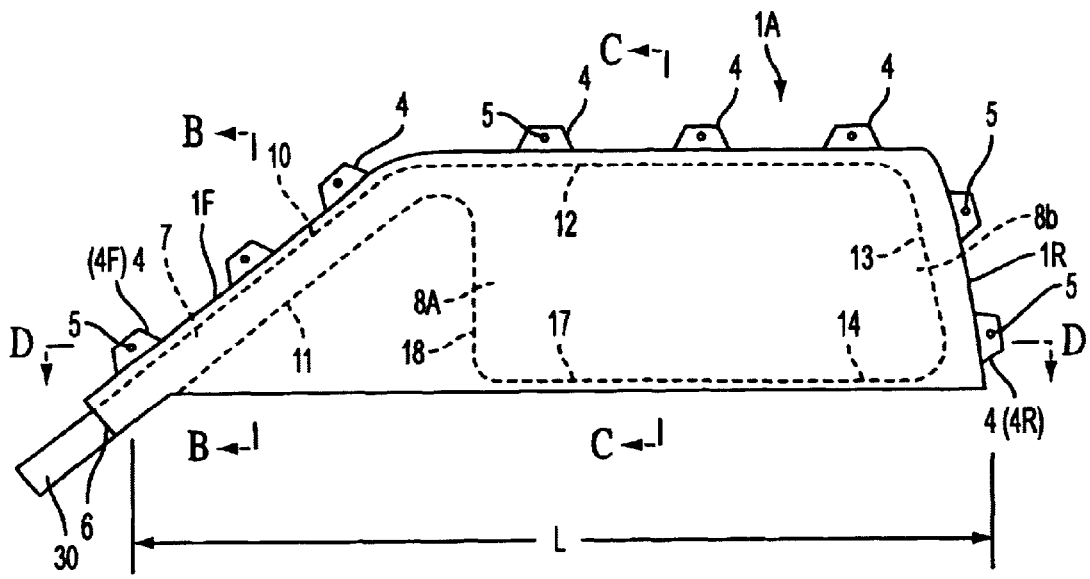
FIG. 7(*a*) is a view showing the structure of a head protective bag for vehicle passengers of a sixth embodiment according to the present invention.
FIG. 7(b) is a sectional view along the lines B—B in FIG. 7(a).
FIG. 7(c) is a sectional view along the lines C—C in FIG. 7(a).
FIG. 7(d) is a sectional view along the lines D—D in FIG. 7(d).
FIG. 7(e) is a sectional view along the lines E—E in FIG. 7(a).
Figure 7B:
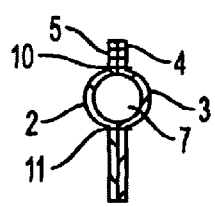
Figure 7C:
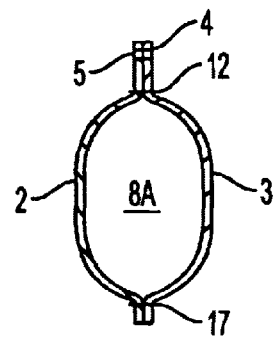
Figure 7D:
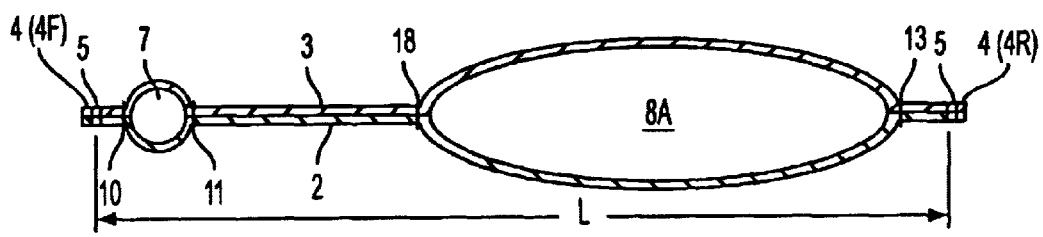
Figure 7E:
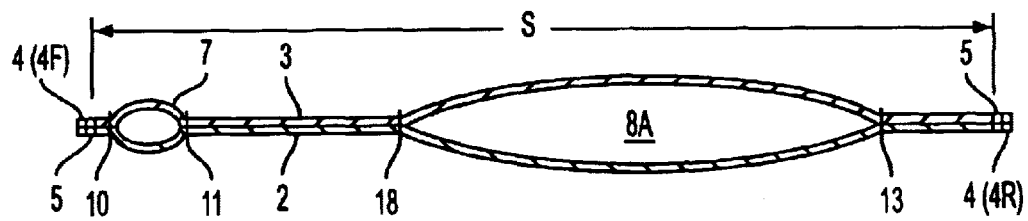

In the bags 40, 50 of FIGS. 4 and 5, the main airway 7 extends along the lower sides of the bags 40, 50. Gas is supplied to the small cells 41, 42, 51, 52 from below. The bag 40 of FIG. 4 includes a plurality of linear coupling portions 43 extending in the upward or downward direction. The linear coupling portions 43 divide the upper sections of the associated small cells 41, 42 to a plurality of sections having a reduced width in the forward or rearward direction. The width of a lower section of each small cell 41, 42 in the forward or rearward direction is thus larger than that of each divided section in the upper section of the cell 41, 42.

In the bag 50 of FIG. 5, an cabin side sheet and a window side sheet are coupled together at point-like or small annular coupling portions 53 in the small cells 51, 52. The number of the coupling portions 53 in an upper section of each small cell 51, 52 is larger than the number of the coupling portions 53 in a lower section of the small cell 51, 52.

When the bags 40, 50 installed in vehicles are inflated, the lower section of each small cell 41, 42, 51, 52 is expanded by a relatively large amount. The portion between the projection 4F and the strap 19 is thus tensioned.

Although a plurality of small cells are formed in the bag of each embodiment, a single inflatable cell (large cell) may replace the small cells. FIGS. 7 to 11 show such embodiments corresponding to the embodiments of FIGS. 1 to 5, respectively.

FIG. 7 shows a protective bag 1A having a single inflatable cell 8A instead of the small cells of the first embodiment shown in FIG. 1. FIG. 7(a) is a front view showing the bag 1A. FIGS. 7(b) to 7(d) are cross-sectional views tale along lines B—B to D—D of FIG. 7(a), respectively. FIG. 7(e) is a cross-sectional view showing the portion shown in FIG. (d) when the bag is installed in a vehicle.

The protective bag 1A of this embodiment includes the cabin side sheet 2 and the window side sheet 3 that are overlapped and then coupled together along a line to form the main airway 7 and the inflatable cell 8A between the sheets 2, 3. The inflatable cell 8A is defined by the linear coupling portions 12, 13, 14, 17, 18. The remaining structure of the protective bag 1A is identical to that of FIG. 1.

A front portion of the bag 1A is located along the A-pillar of the vehicle in a folded state. An intermediate portion and a rear portion of the bag 1A are located along the roof side rail and the C-pillar in a folded state.

If a side of the vehicle is crashed or the vehicle is rolled over, the inflator 30 is activated. Gas is then supplied to the main airway 7 through the gas inlet 6. The gas is introduced to the inflatable cell 8A through the main airway 7 to expand the inflatable cell 8A.

If the bag 1A is maximally inflated without being installed in the vehicle, the dimension L from the through hoe 5 of a lowermost projection 4 (4F) of the front section 1F to the through hole 5 of a lowermost projection 4 (4R) of the rear section 1R is smaller than the linear distance S from a position at which the projection 4F is secured to the A-pillar to a position at which the projection 4R is secured to the C-pillar. Thus, if the bag 1A is inflated as installed in the vehicle, tensile force is produced by the inflating bag 1A between the projections 4F, 4R of the bag 1A. Accordingly, the portion of the bag 1A between the projections 4F, 4R is tightly expanded. As a result, even if a passenger hits the bag 1A, the bag 1A reliably receives the passenger, thus preventing the passenger from moving toward the exterior of the vehicle beyond a window.

To reduce the dimension L with respect to the distance S, the sheets 2, 3 of the bag 1A need be sized appropriately.

The bags 20A, 30A, 40A, 50A each having a single inflatable cell corresponding to the embodiments of FIGS. 2 to 5, respectively, will hereafter be described with reference to FIGS. 8 to 11.

Figure 8:
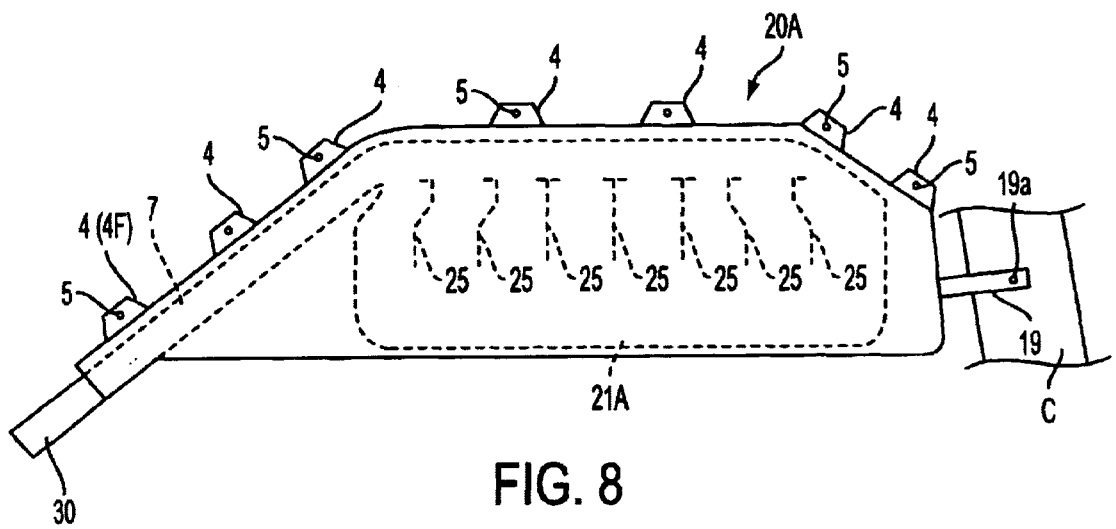
FIG. 8 is a view showing the structure of a head protective bag for vehicle passengers of a seventh embodiment according to the present invention.

In the bag 20A of FIG. 8, an upper section of the inflatable cell 21 A is divided into sections having a relatively small width by relatively short linear coupling portions 25 extending in a upward or downward direction. These sections which have a relatively small width in the forward or rearward direction, do not greatly shorten the dimension of the bag in the forward or rearward direction when the bag is inflated, unlike a lower section of the inflatable cell 21 A having a relatively large width in the forward or rearward direction. In other words, the linear coupling portions 25 do not extend between the through hole 5 of the projection 4F and the hole 19a of the strap 19. Accordingly, when the bag 20A is inflated, the dimension of the inflated bag between the through hole 5 of the projection 4F and the hole 19a of the strap 19 is sufficiently shortened. As a result, when the bag 20A is installed in a vehicle the portion of the bag 20A between the projection 4F and the strap 19 is tightly expanded when the bag 20A is inflated.

Figure 9:
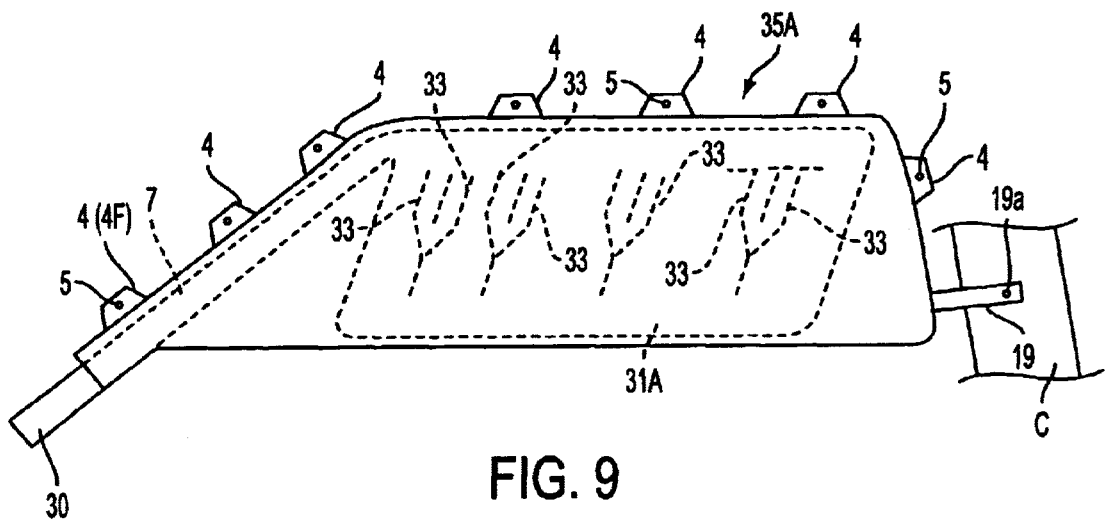
FIG. 9 is a view showing the structure of a head protective bag for vehicle passengers of an eighth embodiment according to the present invention.

In the bag 35A of FIG. 9, a plurality of linear coupling portions 33 extending in the upward or downward direction divide an upper section of the inflatable cell 31A to a plurality of sections having a reduced width in the forward or rearward direction. The width of a lower section of the inflatable cell 31A in the forward or rearward direction is thus larger than that of each divided section in the upper section of the cell 31A. If the bag 35A is installed in a vehicle, the lower section of the bag 35A is tightly expanded when the bag 35A is inflated.

Figure 10:
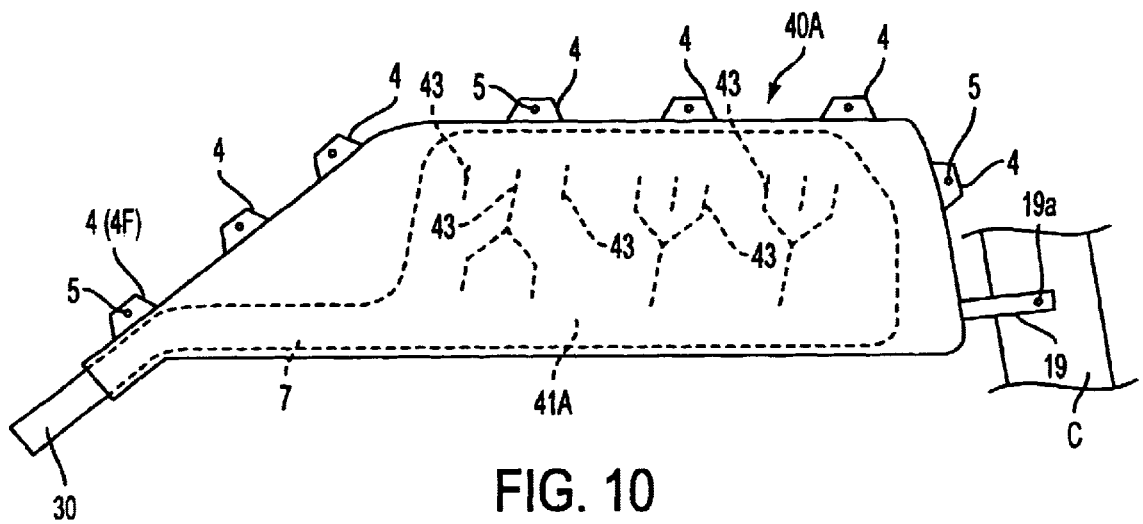
FIG. 10 is a view showing the structure of a head protective bag for vehicle passengers of a ninth embodiment according to the present invention.
Figure 11:
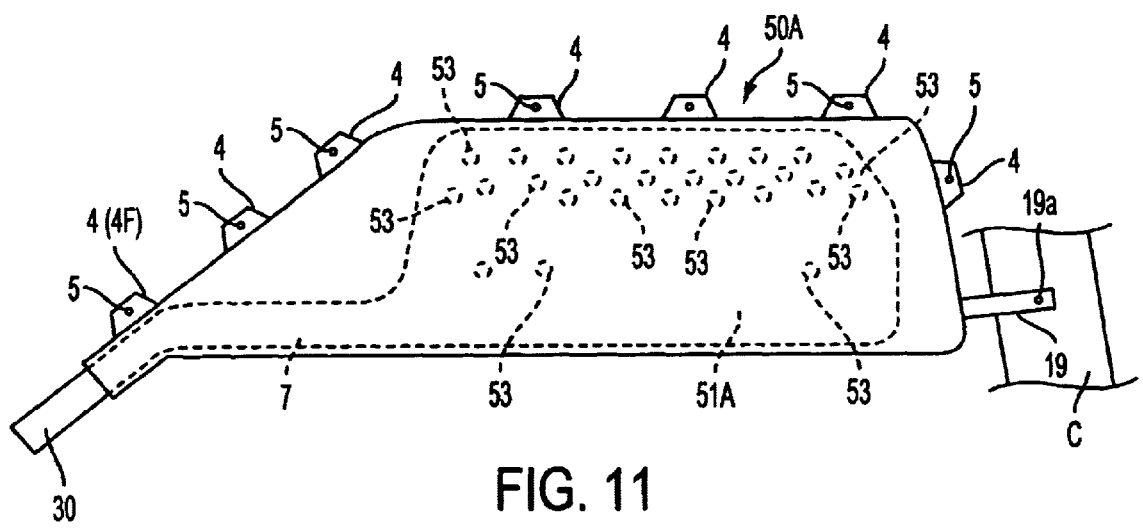
FIG. 11 is a view showing the structure of a head protective bag for vehicle passengers of a tenth embodiment according to the present invention.

In the bags 40A, 50A of FIGS. 10 and 11, the main airway 7 extend along the lower sides of the bags 40A, 50A. Gas is supplied to the inflatable cells 41A, 51A from below. The bag 40A of FIG. 10 includes a plurality of linear coupling portions 43 extending in the upward or downward direction. The linear coupling portions 43 divide an upper section of the inflatable cell 41A to a plurality of sections having a reduced width in the forward or rearward direction. The width of a lower section of the inflatable cell 41A in the forward or rearward direction is thus larger than that of each divided section in the upper section of the cell 41A.

In the bag 50A of FIG. 11, an cabin side sheet and a window side sheet are coupled together at point-like or small annular coupling portions 53 in the inflatable cell 51A. The number of the coupling portions 53 in an upper section of the inflatable cell 51A is larger than the number of the coupling portions 53 in a lower section of the inflatable cell 51A.

When the bag 40A, 50A installed in vehicles is inflated, the lower section of the inflatable cell 41A, 51A is expanded by a relatively large amount. The portion between the projection 4F and the strap 19 is thus tensioned.

Although the rear section 1R is located along the C-pillar in each embodiment, the rear pillar shown in the drawings may represent the B, C or D pillar of a vehicle. Thus, the rear section R1 may be located along the B-pillar or the D-pillar.

As described, a head protective bag for vehicle passengers according to the present invention has a lower section that is tightly expanded in a forward or rearward direction when the bag is inflated, thus protecting the passengers reliably. Accordingly, it is understood the present invention is not limited to the details of any one embodiment in any one figure, but are defined by the appended claims. The scope of the appended claims should be interpreted to encompass all such modifications, similar arrangements and procedures.

I claim:

1. A head protective bag for passengers located in a vehicle, the bag adapted to be located along an interior side wall of the vehicle and configured to be inflated by gas from an inflator, the bag comprising:

a cabin side sheet and a window side sheet, wherein the sheets are connected to form an inflatable cell having a single opening for receiving gas from the inflator configured so that when the cell is inflated a bottom edge of the cell extends substantially horizontally along the side wall of the vehicle; and first and second linear coupling portions located within the inflatable cell and positioned so that when the bag is inflated the linear coupling portions are completely surrounded by inflated portions of the cell; and wherein the cell includes an upper portion and a lower portion, the upper portion being defined by a half of the cell located closest to a roof of the vehicle when the bag is inflated; and wherein the linear coupling portions are positioned so that a majority of each linear coupling portion is located in the upper portion of the cell.

2. The bag of claim 1, wherein the linear coupling portions are each formed by a single line of stitching.

3. The bag of claim 1, wherein the cell includes a gas inlet located in the upper portion of the cell.

4. The bag of claim 1, wherein the sheets are connected to form a second inflatable cell having a single opening for receiving gas from the inflator.

5. The bag of claim 4, wherein the second inflatable cell includes a third linear coupling portion surrounded by inflatable portions of the second cell.

6. The bag of claim 5, wherein the second inflatable cell is adjacent the first inflatable cell so that a connection between the cabin side sheet and the window side sheet forms a boundary for both the first inflatable cell and the second inflatable cell.

7. The bag of claim 5, wherein the second inflatable cell is located within the first inflatable cell.

8. The bag of claim 5, wherein the second inflatable cell is located spaced apart from the first inflatable cell in the forward and rearward direction of the vehicle so that an inflatable portion of the bag is located between the first and second inflatable cells.

9. The bag of claim 1, wherein the first and the second linear coupling portions are substantially parallel and extend in a direction from a floor to a roof of the vehicle adjacent to the same inflatable portion of the cell.

10. A head protective bag for passengers located in a vehicle, the bag adapted to be located along an interior side wall of the vehicle and configured to be inflated by gas from an inflator, the bag comprising:

a cabin side sheet and a window side sheet, wherein the sheets are connected to form a first and a second inflatable cell, wherein each cell includes a single opening for receiving gas from the inflator;

wherein a linear coupling portion is located within each of the inflatable cells and positioned so that when the bag is inflated the linear coupling portion is completely surrounded by inflated portions of the cell; and wherein each cell includes an upper portion and a lower portion, the upper portion being defined by a half of the cell located closest to a roof of the vehicle when the bag is inflated; and wherein each linear coupling portion is positioned so that a majority of the linear coupling portion is located in the upper portion of the cell.

11. A head protective bag for passengers located in a vehicle, the bag adapted to be located along an interior side wall of the vehicle and configured to be inflated by gas from an inflator, the bag comprising:

a cabin side sheet and a window side sheet, wherein the sheets are connected to form first and second inflatable cells each having a single opening for receiving gas from the inflator;

a plurality of annular coupling portions located within the inflatable cells and positioned so that when the bag is inflated each of the annular coupling portions is completely surrounded by inflated portions of the cell; and wherein the first and second cells each include an upper portion and a lower portion, the upper portion being defined by a half of the cell located closest to a roof of the vehicle when the bag is inflated; and wherein the majority of the annular coupling portions are located in the upper portion of the cell.

* * * * *